Patented Aug. 28, 1951

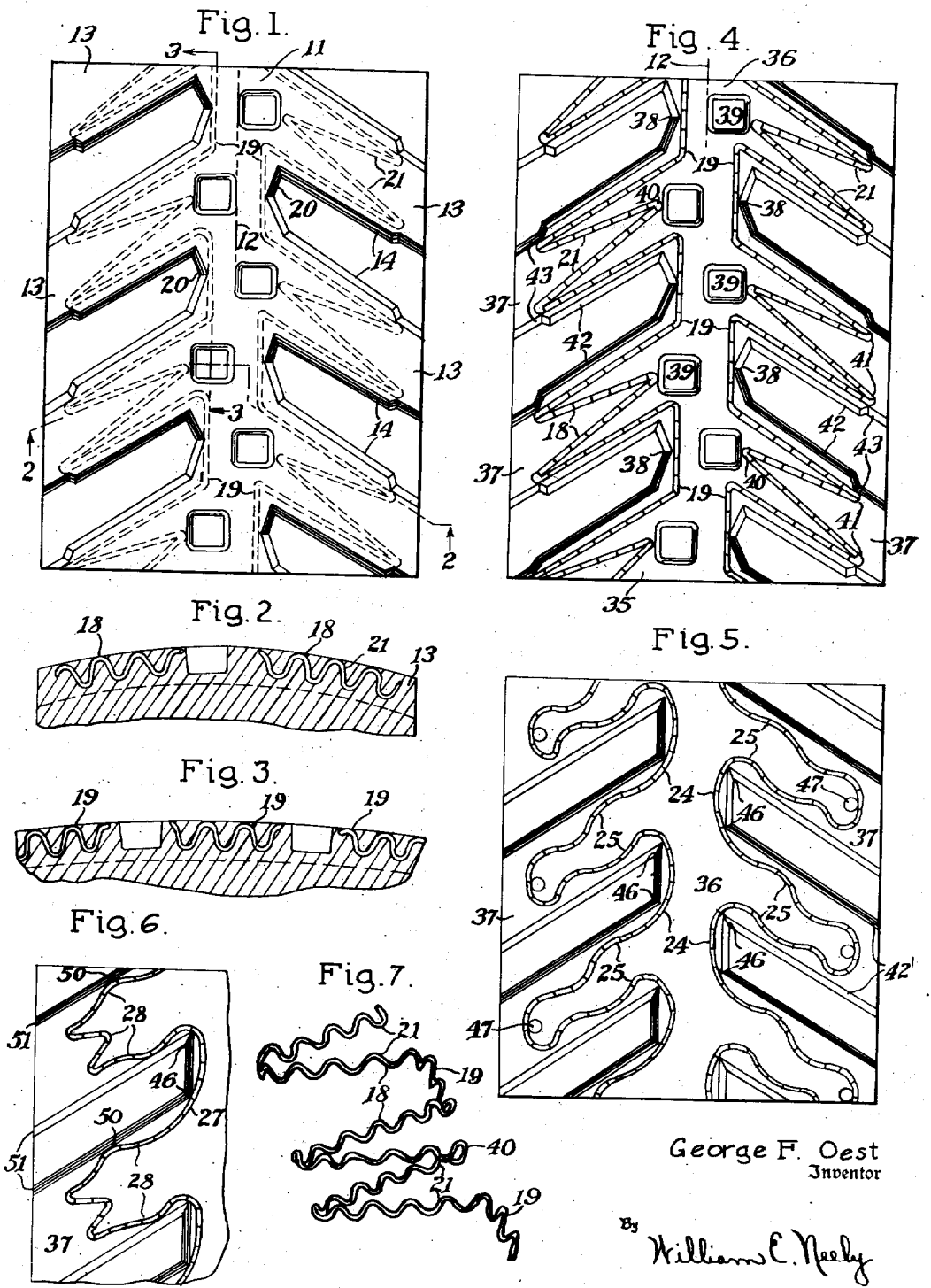

2,565,620

UNITED STATES PATENT OFFICE 2,565,620

WINTER TIRE

George F. Oest, Rochester, N. Y., assignor of one-fifth to Walter Oest, Omaha, Nebr., and one-fifth to Irwin W. Oest, Minneapolis, Minn.

Application May 6, 1950, Serial No. 160,496

14 Claims. (Cl. 152—211)

The present invention relates to a pneumatic tire casing (either new, recap, or retread) primarily intended for automobiles, trucks and similar mechanisms, and more particularly to such a casing formed with a nonskidding snow tread. The term "snow tread" refers to the usual and well-known large, thick rubber treads, or blocks formed on tire casings designed primarily for winter driving.

Really effective winter tires should (1) prevent skidding on ice, (2) offer the necessary degree of traction in snow and/or slush, and (3) give sufficient traction when both snow and ice are encountered. Over the last several decades, there have been many attempts to provide a satisfactory winter tire which would meet the above requirements. However, so far as applicant is aware, only the tire structure disclosed in applicant's copending application Serial No. 111,829, filed August 23, 1949, and the improved tire structure disclosed in the present application satisfactorily meet the requirements noted above.

There is a tire on the market today, incorporating coils of wire in the circumference treads of the tire, as shown in Fig. 1 of the applicant's copending application. These coils are so arranged as to expose various segments of wire as the treads wear down, thereby offering resistance to skidding on ice. However, the tire now on the market is what may be called a "summer-type" of tire as distinguished from a "snow-tread" or winter-type of tire. While such a tire possesses utility, it does not satisfactorily meet all the requirements noted above for a winter-type of tire. Specifically, it is not satisfactory in snow of any substantial depth. Also, it has been applicant's experience that if there is a deposit of snow or powdered ice on top of hard ice on the street, this "summer-type" of tire skids along as readily as an ordinary "summer-type" of tire.

If, on the other hand, wire could be used as an abrasive in a snow-tread tire, the snow tread itself would cut down through the loose snow or ice and allow the wire in the tread to make contact with the solid ice below, thereby materially reducing skidding. This type of tire then would be an all-purpose winter tire for use on either snow or ice.

The present invention provides a snow-tread tire in which a wire is embedded in the tread in such a manner that the tire will give the required traction for satisfactory operation of the vehicle being used under the various conditions described above. The advantages of such a tire are deemed apparent. The wire arrangement of the tire of the present invention lends itself to an inexpensive and feasible method of incorporating the wire in the tire tread during the molding thereof. The design of the tire tread as well as that of the abrasive wire permits ready and easy placing of the wire in the mold, and positioning members in the mold accurately and positively retain the wire in position therein. To this end, the mold is formed with a single peripheral groove to form a continuous peripheral tread on the center portion of the tire. Lateral recesses extend out from the opposite sides of the peripheral recess and form the lateral treads on the finished tire.

The wire abrasive in the preferred form comprises a piece of hard drawn steel wire which is crimped radially, as will be later described, and then shaped or formed to provide peripherally-spaced sections and laterally-spaced sections which are positioned in the peripheral and lateral recesses of the mold, respectively, as will later be more fully described. Means in the recesses serve to position the sections therein. The result is that all the operator of the tire mold needs to do is to take a piece of preformed, crimped wire equal in length to the circumference of the tire and place it into the bottom half of the tire mold, the positioning means therein serving to retain the wire in proper position. A similar piece of wire is then placed in the top half of the mold and held in position therein. The process of forming the tire treads is then carried out in the usual manner. The finished tire will then appear as shown in Fig. 1, with the two shaped, crimped wires arranged on opposite sides of the center line of the tire.

The present invention thus has as its principal object the provision of a new and improved snow-tread tire which will provide sufficient traction under snow, ice or slush conditions, or any combinations thereof.

A further object of the invention is the provision of a wire abrasive means which is so positioned in the tire mold so as to facilitate easy and inexpensive incorporation of the wire in the tire tread.

Still another object of the invention is the provision of a tire mold having means to position a wire accurately and positively therein.

To these and others ends, invention resides in certain improvements and combinations of parts, all as will be hereinafter more fully described, the novel features being pointed out in the claims at the end of the specification.

In the drawings:

Fig. 1 is a plan view of a portion of a tire casing provided with a snow tread, showing the relation thereto of a nonskidding and traction-producing member constructed and arranged in accordance with the preferred embodiment of the invention.

Fig. 2 is a transverse sectional view through a portion of the tire illustrated in Fig. 1, and taken substantially on line 2—2 thereof, showing the relation of the preshaped, crimped wire in the lateral treads;

Fig. 3 is a longitudinal sectional view taken substantially on line 3—3 of Fig. 1, showing the relation of the spaced peripheral sections of the crimped wire in the peripheral tread;

Fig. 4 is a plan view of the mold from which the tire of Fig. 1 is formed, showing one form of preshaped, crimped wire arrangement, and one means for holding and positioning the crimped wire in the mold;

Fig. 5 is like Fig. 4, but shows a modified form of preshaped, crimped wire, and a modified method of positioning and holding the latter in the mold;

Fig. 6 is a partial plan view of a mold similar to that illustrated in Fig. 5, showing still another modification of the preshaped, crimped wire, and the arrangement for holding and positioning such a wire in the mold; and Fig. 7 is a plan view of one form of preshaped, crimped wire used to provide an abrasive member, such as shown in Figs. 1 and 4.

Similar reference numerals throughout the various views indicate the same parts.

Fig. 1 of the drawings shows a nonskidding and traction-producing tire formed with a snow tread which comprises a single peripheral tread 11 which extends completely around the tire and is arranged symmetrically with the center line 12. As is apparent from Fig. 1, a plurality of peripherally-spaced lateral treads 13 are positioned on opposite sides of and are connected at their inner ends to the peripheral tread 11. As is common practice in the manufacture of snow tires, the sides of each lateral tread 13 are flared out somewhat, as shown at 14, so that these treads get heavier as they approach the bottom of the tread. As indicated in Fig. 1, the lateral treads 13 are slightly inclined relative to the tread 11 and preferably in a direction opposite to the direction of travel of the tire. This enables the tire to brush aside loose snow or ice, and dig down to the hard-surface of the road as the brakes are applied. Also, the lateral treads on opposite sides of the peripheral tread are arranged in staggered relation. This is by way of illustration only, and the applicant is not to be limited to the precise arrangement of treads, or the angle of the lateral treads to the peripheral tread, except as is necessitated by the prior art and the scope of appended claims.

In order to secure the nonskidding and traction-producing effects, the treads 11 and 13 have incorporated therein abrasive members or elements in the form of wire strips embedded in the treads, as shown in Figs. 2 and 3. Each wire, prior to insertion in the tire, is crimped, as shown at 18, Fig. 7, to provide a plurality of sinuous folds or corrugations which are so arranged that when the crimped wire is positioned in the tire the crimping extends radially of the tire, as clearly illustrated in Figs. 2 and 3. In the preferred form, the wire is about 3/64" in diameter, and the corrugations measure about 3/8" from top to bottom and about 1/2" across from crest to crest. Inasmuch as the wire must flex with the rubber of the tire and must be reasonably wear resistant, a hard drawn spring steel wire is specified. However, all of these specifications in regard to dimensions and type of wire could vary somewhat, and the shape of the corrugations could range from U-shaped or squared to V-shaped.

After the wire has been thus crimped, it is bent to form peripherally-spaced aligned sections 19 which are adapted to be positioned in the peripheral tread 11 adjacent an edge 20 thereof between the lateral treads 13. Intermediate the spaced sections 19, the crimped wire is formed to provide a plurality of peripherally-spaced, zig-zag loop sections 21, each of which is positioned between adjacent sections 19 and extends laterally therefrom and into the lateral tread 13 as shown in Fig. 1. Thus, a single strand of crimped wire is formed to provide spaced abrasive sections 19 positioned in the peripheral tread 11, and intermediate abrasive sections 21 positioned in the lateral treads 13 and connected to the sections 19 in the peripheral tread.

In the preferred arrangement, two such crimped and looped wires are used per tire, the wires being positioned symmetrically with respect to the center line 12, as shown in Fig. 1. While it is preferred that each wire be in the form of a single continuous wire extending completely around the tire, it is possible that, for ease of handling, the wires may be used in shorter sections. The crimped wire may be preformed and either cut into predetermined lengths or else wound in large rolls and stored until ready for use, at which time the necessary lengths may be cut from the roll.

When the tire is new, the crests of the crimped wires appear at the surface of each tread element. As the tire wears, the wires wear down at approximately the same rate as the rubber, leaving points of wire exposed after the crests have worn through. Thus, the wire in the tire offers an abrasive surface both when the tire is new and during its subsequent life.

Fig. 5 shows a slightly modified arrangement in which the sections 24 of the wire, arranged in the peripheral tread 11, are slightly bowed, for reasons to be later described. These sections 24 are connected by irregular or wavy loops 25 which extend into the lateral treads 13. As in the arrangement shown in Fig. 1, Fig. 5 also uses two wires positioned on opposite sides of the center tread 11 and extending into the lateral treads 13. Also, the wires shown in Fig. 5 are preshaped and crimped as illustrated in Fig. 7.

Fig. 6 shows still another modification in which the wire is bent to form peripherally-spaced sections 27 similar to 24 shown in Fig. 5. The sections 27 are connected by W-shaped loops 28 in the lateral treads 13. Here, again, two wires are used, one on each side, and the wires are preshaped and precrimped, as above explained, but only a portion of one such wire is illustrated.

Thus, the tire of the present invention is provided with a pair of peripherally-extending, preshaped and crimped wires, each of which is formed with spaced sections (19, 24 or 27) positioned in the peripheral tread 11 intermediate the lateral treads 13. Each wire has also formed thereon a plurality of peripherally-spaced and laterally-extending loop sections (21, 25 or 28) which are connected to and positioned between adjacent peripheral sections and arranged in the lateral treads 13. By means of this arrangement, all the treads are provided with the desirable abrasive member. While, as mentioned above, each wire is continuous around the tire, the wire may be in the form of separate sections of smaller length without departing from the scope of the present invention. Furthermore, while it is desirable to provide each lateral tread with an abrasive member, it is contemplated that the wire in certain of the lateral members may be omitted, if desired. The important thing is that both the peripheral tread 11 and at least certain of the lateral treads 13, preferably all, are provided with wire inserts which are embedded in the treads to provide the desired non-skidding and traction-producing properties.

In addition to providing the above-mentioned desirable features, the wire arrangements of the present invention permit easy and ready insertion of the wires in the mold. Also, they readily lend themselves to the use of simple and inexpensive positioning means in the molds.

Referring now to Fig. 4, there is shown a portion of a mold 35 used in connection with the tire and wire arrangement shown in Fig. 1. The mold 35 is formed with a central recess 36 which will form the peripheral tread 11. Lateral recesses 37 extend outwardly from the opposite sides of recess 36 and serve to form the lateral treads 13. As such structures are well known to those skilled in the tire-making art, further details are not deemed necessary. In order to position each wire in the mold, the recess 36 is formed with a plurality of peripherally-spaced abutments 38 positioned between the recesses 37 and adapted to engage the sections 19 of the wires. The recess 36 is also provided with a plurality of peripherally-spaced lugs or bosses 39 which are arranged in alignment with the recesses 37, and are adapted to engage the apexes 40 of the center loops of the wires in the recesses 37. The outer lower corners 41 of the loops engage opposite shoulders 43 formed on the sides 42 of the recesses 37. Thus, the shoulders 43 cooperate with the bosses 39 and the abutments 38 to provide peripherally-spaced, four-point supports for the wires to position the latter in the mold.

Fig. 5 shows a slightly modified form of mold to accommodate the type of wire illustrated in this figure. Parts corresponding to Fig. 4 are designated by the same numerals. The bowed section 24 of each wire is curved so as to engage the corners or abutments 46 formed at the juncture of the peripheral recess 36 and lateral recess 37. A pin or lug 47 is formed in each recess 37 and engages the loop 25 positioned therein and cooperates with the corners 46 to provide a three-point support and positioning element for each loop and its associated parts.

Fig. 6 shows still another modified form of mold for use in connection with the wire structure shown in this figure. This type of mold is less specialized than those shown in Figures 4 and 5, and the wire form indicated in Fig. 6 could be adapted to many molds already being used. Parts of the mold in Fig. 6 correspond to Figs. 4 and 5 and are designated by the same numerals. Like Fig. 5, the mold of Fig. 6 is formed with peripherally-spaced corners 46 to engage the bowed sections 27. However, in this modification the pins 47 are omitted. In order to retain the loops 28 in position in the recesses 37, each loop is made of a width slightly greater than the recess 37 so that when placed in the latter, outer portions 50 of each loop spring outwardly and engage the opposite sides 51 of the recesses frictionally to retain each loop in position in its recess 37, as is deemed apparent from an inspection of Fig. 6.

Thus, in each of the embodiments shown in Figs. 4, 5 and 6, cooperating elements in the central recess 36 and in the lateral recesses 37 serve to position the wires accurately and positively in position in the mold. All that the operator has to do is to cut the proper length of wire and then position it in the mold. Such positioning means are simple and inexpensive, yet permits rapid and accurate placing of the wire in the mold.

It will be apparent from the above description that the present invention provides a snow-tread tire, the treads of which have embedded therein abrasive elements which will prevent skidding on ice and will also afford the desired traction in snow, powdered ice and/or slush. The abrasive members are so designed that they may be easily and readily placed in the mold; and, when so placed, are accurately positioned and held by means formed in the mold itself. The result is that during the tread-forming operation, the wires are retained in proper position so that, when the complete tire is formed, the wires will be in desired relation with the treads 11 and 13.

While a durable flexible metal wire, such as a hard-drawn spring wire, has been disclosed as the preferred abrasive element, it is here noted that wherever the term "wire" is used in the claims, it is to be construed generically to cover not only a metal wire, but also any durable flexible filament suitable for use as an abrasive element and adapted to be formed or shaped in the manner indicated in the specification and drawings.

While certain embodiments of the invention have been disclosed, it is apparent that the inventive idea may be carried out in a number of ways. Therefore, this application is not to be limited to the precise details described, but is intended to cover all variations and modifications thereof falling within the scope of the appended claims.

Having thus described my invention, what I claim is new and desire to secure by Letters Patent of the United States is:

1. In a pneumatic tire casing, the combination with a snow tread having a single continuous planar peripheral tread and a plurality of peripherally-spaced lateral treads connected to and projecting laterally from said peripheral tread, of an anti-skidding member embedded in said casing and comprising a strip of wire formed to provide peripherally-spaced sections positioned in said peripheral tread, and laterally-extending sections positioned in said lateral treads.

2. In a pneumatic tire casing, the combination with a snow tread having a continuous planar peripheral tread and a plurality of peripherally-spaced lateral treads connected to and projecting laterally from said peripheral tread, of an anti-skidding member embedded in said casing and comprising a strip of wire formed to provide spaced peripheral sections positioned in said peripheral tread intermediate said lateral treads, and sections projecting laterally from said first sections and positioned in said lateral treads.

3. In a pneumatic tire casing, the combination with a snow tread having a continuous planar peripheral tread and a plurality of peripherally-spaced lateral treads connected to and projecting laterally from said peripheral tread, of an anti-skidding member embedded in said casing and comprising a strip of wire formed to provide spaced peripheral sections arranged in aligned relation in said peripheral tread and positioned between said lateral treads, and loop sections connected to said first sections and positioned in said lateral treads.

4. In a pneumatic tire casing, the combination with a snow tread having a continuous peripheral tread and a plurality of peripherally-spaced lateral treads connected to and projecting laterally from said peripheral tread, of an anti-skidding member embedded in said casing and comprising a strip of wire which is crimped radially and formed to provide aligned peripheral sections arranged in spaced relation in said peripheral tread between said lateral treads, and continuous loop sections positioned in the lateral treads and arranged between and connected to adjacent peripheral sections.

5. In a pneumatic tire casing, the combination with a snow tread having a continuous peripheral tread and a plurality of peripherally-spaced lateral treads connected to and projecting laterally from said peripheral tread, of an anti-skidding member embedded in said casing and comprising a strip of wire extending substantially around a said tire and formed to provide a plurality of peripherally-spaced sections positioned in said peripheral tread, and a plurality of peripherally-spaced sections extending laterally from and connected to adjacent peripheral sections and positioned in said lateral treads.

6. In a pneumatic tire casing, the combination with a snow tread having a continuous peripheral tread and a plurality of peripherally-spaced lateral treads connected to and projecting laterally from said peripheral tread, of an anti-skidding member embedded in said treads and comprising a piece of radially-crimped wire extending substantially around said tire and formed to provide a plurality of peripherally-spaced sections positioned in said peripheral tread intermediate said lateral treads, and laterally-extending sections connected to adjacent peripheral sections and positioned in said lateral treads.

7. In a pneumatic tire casing, the combination with a snow tread having a continuous peripheral tread and a plurality of peripherally-spaced lateral treads connected to and projecting laterally from said peripheral tread, of an anti-skidding member embedded in said treads and comprising a piece of radially-crimped wire extending substantially around said tire and formed to provide a plurality of peripherally-spaced sections positioned in said peripheral tread intermediate said lateral treads, and laterally-extending loop sections connected to adjacent peripheral sections and positioned in said lateral treads.

8. In a pneumatic tire casing, the combination with a snow tread having a continuous peripheral tread and a plurality of peripherally-spaced lateral treads connected to and projecting laterally from said peripheral tread, of an anti-skidding member embedded in said treads and comprising a piece of radially-crimped wire extending substantially around said tire and formed to provide a plurality of peripherally-spaced sections arranged in peripheral alignment and positioned in said peripheral tread between said lateral treads, and peripherally-spaced, laterally-extending loop sections positioned between and connected to adjacent peripheral sections and positioned in said lateral treads.

9. In a pneumatic tire casing, the combination with a snow tread having a continuous peripheral tread and two groups of peripherally-spaced lateral treads connected to and projecting laterally from opposite sides of said peripheral tread, of an anti-skidding device embedded in said treads and comprising separate pieces of wire positioned on opposite sides of said peripheral tread, each wire having spaced peripheral sections arranged adjacent one edge of said peripheral tread and lateral sections between the lateral treads, and lateral sections positioned in the lateral treads and connected to adjacent peripheral sections.

10. In a pneumatic tire casing, the combination with a snow tread having a continuous peripheral tread symmetrical with the center of said casing and peripherally-spaced lateral treads connected to and projecting laterally from the opposite sides of said peripheral tread, of an anti-skidding device embedded in said treads and comprising separate pieces of wire positioned on opposite sides of said center, each piece being formed to provide peripherally-spaced sections arranged in said peripheral tread adjacent one edge thereof, and laterally-extending sections arranged between and connected to adjacent peripheral sections and positioned in said lateral treads.

11. In a pneumatic tire casing, the combination with a snow tread having a continuous peripheral tread symmetrical with the center of said casing and peripherally-spaced lateral treads connected to and projecting laterally from the opposite sides of said peripheral tread, of an anti-skidding device embedded in said treads and comprising separate pieces of wire positioned on opposite sides of said center and extending substantially around of said tire, each piece being formed to provide a plurality of peripherally-spaced sections arranged in said peripheral tread adjacent one side thereof and between the lateral treads connected to said one side, and irregularly formed sections arranged between and connected to adjacent peripheral sections and positioned in the lateral treads extending from said one side.

12. In a pneumatic tire casing, the combination with a snow tread having a continuous peripheral tread symmetrical with the center of said casing, and peripherally-spaced, lateral treads connected to and projecting laterally from the opposite sides of said peripheral tread, of an anti-skidding device embedded in said treads and comprising separate pieces of radially crimped wire positioned on opposite sides of said center, each piece being formed to provide peripherally-spaced sections arranged in said peripheral tread adjacent one edge thereof, and laterally-extending sections arranged between and connected to adjacent peripheral sections and positioned in said lateral treads.

13. In a pneumatic tire casing, the combination with a snow tread having a continuous peripheral tread symmetrical with the center of said casing and peripherally-spaced lateral treads connected to and projecting laterally from the opposite sides of said peripheral tread, of an anti-skidding device embedded in said treads and comprising separate pieces of radially-crimped wire positioned on opposite sides of said center, each piece being formed to provide peripherally-spaced sections arranged in said peripheral tread adjacent one edge thereof, and loop sections connected to and positioned between adjacent peripheral sections and extending laterally therefrom and arranged in the lateral treads connected to said one side.

14. In a pneumatic tire casing, the combination with a snow tread having a continuous peripheral tread symmetrical with the center of said casing and peripherally-spaced lateral treads connected to and projecting laterally from the opposite sides of said peripheral tread, of an anti-skidding device embedded in said treads and comprising a piece of radially-crimped wire positioned on one side of said center and formed to provide peripherally-extending sections embedded in said peripheral tread adjacent one edge thereof, loop sections formed in said wire between and connected to adjacent peripheral sections and positioned in the lateral treads extending from one side of said peripheral tread, a separate and independent piece of radially-crimped wire positioned on the other side of said center and formed with peripherally-spaced sections embedded in said peripheral tread adjacent the other side thereof, and loop sections formed in said second piece between and connected to the peripheral sections thereof and positioned in the lateral treads connected to the other side of said peripheral tread.

GEORGE F. OEST.

REFERENCES CITED

The following references are of record in the file of this patent:

UNITED STATES PATENTS

| Number | Name | Date |
|---|---|---|
| 1,176,165 | Rasmussen | Mar. 21, 1916 |
| 1,740,916 | Midgley | Dec. 24, 1929 |
| 2,006,038 | Yamaki | June 25, 1935 |
| 2,113,066 | Hoover | Apr. 5, 1933 |
| 2,121,956 | Eger | June 28, 1938 |
| 2,415,291 | Kreyer | Feb. 4, 1947 |
| 2,479,474 | Crooker | Aug. 16, 1949 |

Certificate of Correction

Patent No. 2,565,620                                  August 28, 1951

GEORGE F. OEST

It is hereby certified that error appears in the printed specification of the above numbered patent requiring correction as follows:

Column 6, line 50, strike out "single" and insert the same in line 60 before the word "continuous";

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*